(12) United States Patent
Zolnowsky

(10) Patent No.: US 6,918,000 B2
(45) Date of Patent: *Jul. 12, 2005

(54) USB HUB WITH SOFT SELECT PORTS

(75) Inventor: Jeffrey D. Zolnowsky, Dakota Dunes, SD (US)

(73) Assignee: Gateway Inc., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/783,660

(22) Filed: Feb. 20, 2004

(65) Prior Publication Data

US 2004/0162929 A1 Aug. 19, 2004

Related U.S. Application Data

(63) Continuation of application No. 09/752,322, filed on Dec. 29, 2000, now Pat. No. 6,718,423.

(51) Int. Cl.$^7$ .................................................. G06F 1/00
(52) U.S. Cl. ............................... 710/313; 710/8; 710/9; 710/16
(58) Field of Search ................................ 710/305–306, 710/309–315, 300–304, 8–12, 14–19; 713/1–2, 100

(56) References Cited

U.S. PATENT DOCUMENTS

| | | | | |
|---|---|---|---|---|
| 6,058,441 A | * | 5/2000 | Shu | 710/100 |
| 6,067,628 A | * | 5/2000 | Krithivas et al. | 713/340 |
| 6,389,560 B1 | * | 5/2002 | Chew | 714/43 |
| 6,484,219 B1 | * | 11/2002 | Dunn et al. | 710/42 |
| 6,535,947 B1 | * | 3/2003 | Amoni et al. | 710/305 |
| 6,567,875 B1 | * | 5/2003 | Williams et al. | 710/302 |
| 6,735,720 B1 | * | 5/2004 | Dunn et al. | 714/43 |

\* cited by examiner

*Primary Examiner*—Paul R. Myers
*Assistant Examiner*—Raymond N Phan
(74) *Attorney, Agent, or Firm*—Feng Zhu; Sutter West Swantz

(57) ABSTRACT

The present invention is directed to a USB hub with soft select ports. A universal serial bus (USB) hub suitable for indicating a user-selectable number of ports may include a universal serial bus (USB) hub suitable for facilitating universal serial bus (USB) communication between a host and a device. A register suitable for storing an actual port value indicating a number of universal serial bus (USB) ports connected to the universal serial bus (USB) hub may be included, the actual port value suitable for being changed by a user.

21 Claims, 6 Drawing Sheets

USB HUB WITH SOFT SELECT PORTS

CROSS REFERENCE TO RELATED APPLICATIONS

The present application is a continuation of U.S. patent application Ser. No. 09/752,322, filed Dec. 29, 2000 now U.S. Pat. No. 6,718,423, herein incorporated by reference in its entirety.

FIELD OF THE INVENTION

The present invention generally relates to the field of information handling systems, and particularly to a USB hub with soft select ports.

BACKGROUND OF THE INVENTION

The variety of information handling systems is increasing constantly. With this variety comes the ever-increasing complexity of the configuration, manufacture, and assembly of the information handling systems. For example, one area that was in need of simplification included how devices were connected to an information handling system. Previously, a variety of connectors were required to connect different types of devices to the information handling system. A universal serial bus (USB) is one method utilized to address this complexity by providing a standardized interface for the connection of a variety of devices, such as keyboards, mouse, digital cameras, printers, musical devices, scanners, wireless devices, audio/visual devices such as digital cameras and video conferencing devices, fast storage units, and the like.

However, one of the problems with incorporating a Universal Serial Bus (USB) with an information handling system is having the number of ports desired on the system correspond to the number of ports supported by the interface. Previously, the number of ports supported by a USB hub was set up through an external hardware change, such as by selecting the number of ports by an Input Pin. This required extensive hardware changes by manufacturers of the system.

In certain applications, manufacturers incorporated a USB hub capable of supporting more ports than were actually included on the information handling system. Thus, the information handling system may report a greater number of ports than were actually available on the system, resulting in consumer confusion. To correct this confusion, the manufacturer had to use specific USB hubs for specific applications. Therefore, a large number of hubs were required for various applications, resulting in inefficiencies in both the manufacture and assembly of the hubs.

Consequently, it would be desirable to provide a USB hub capable of supporting a variety of ports as desired by a user and also capable of being changed without extensive hardware modifications.

SUMMARY OF THE INVENTION

Accordingly, the present invention is directed to a USB hub with soft select ports. In a first aspect of the present invention, a universal serial bus (USB) hub suitable for indicating a user-selectable number of ports includes a universal serial bus (USB) hub suitable for facilitating universal serial bus (USB) communication between a host and a device, and a register for storing an actual port value indicating a number of universal serial bus (USB) ports connected to the universal serial bus (USB) hub, the actual port value suitable for being changed by a user.

In an additional aspect of the present invention, a universal serial bus (USB) hub suitable for indicating a user-selectable number of ports includes a universal serial bus (USB) hub suitable for facilitating universal serial bus (USB) communication between a host and a device. A software component suitable for storing an actual port value is included for indicating number of universal serial bus (USB) ports connected to the universal serial bus (USB) hub, the actual port value suitable for being changed by a user.

In a further aspect of the present invention, a method of indicating a number of actual universal serial bus (USB) ports on an information handling system includes receiving a query for a universal serial bus (USB) hub port value. A universal serial bus (USB) hub port value is returned suitable for being changed by a user.

In another aspect of the present invention, a method of setting an actual port value of an information handling system having a universal serial bus (USB) hub, includes accessing a universal serial bus (USB) hub. The universal serial bus (USB) hub is programmed with an actual port value, wherein the actual port value corresponds to the actual number of ports included on the information handling system.

In still a further aspect of the present invention, a method of manufacturing an information handling system includes a universal serial bus (USB) hub, includes receiving an order for an information handling system including a universal serial bus (USB) hub. The universal serial bus (USB) hub is programmed with an actual port value, wherein the actual port value corresponds to the actual number of ports included on the information handling system.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 6, exemplary embodiments of the present invention are shown. A USB interconnect supports data traffic between a host, such as an information handling system, including typical desktop computers, laptops, personal digital assistants, digital information appliances, convergence systems, and the like, and a USB device. A host interface may be utilized to facilitate USB communication between a software client, resident on the host, and a function implemented on a device. The following description is provided as an example to illustrate host system behavior expected by a USB device. However, a variety of host system behaviors are contemplated by the present invention without departing from the spirit and scope thereof.

Figure 1:
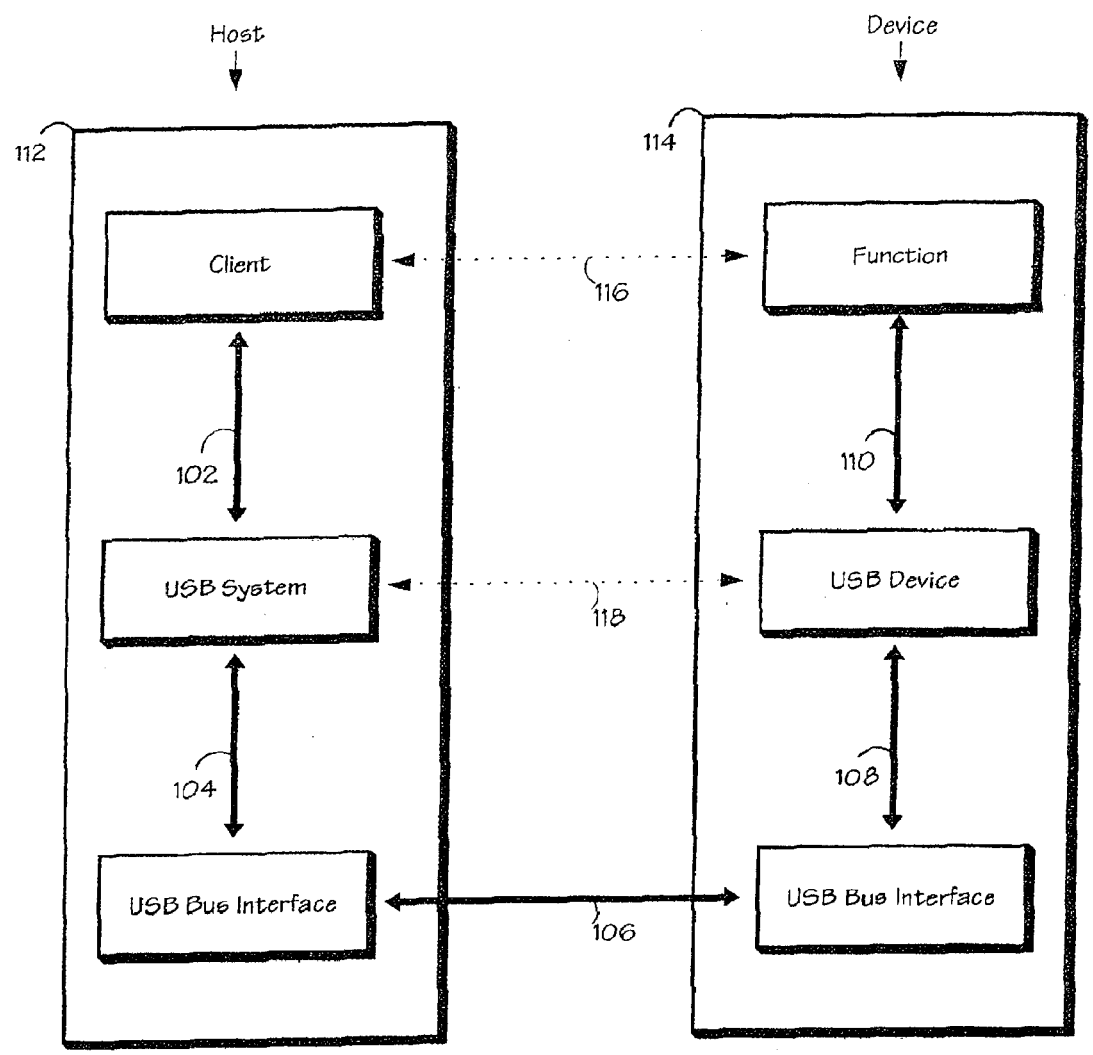
FIG. 1 is a block diagram depicting an exemplary embodiment of the present invention wherein an interrelationship of a USB communication model is shown.

Referring now to FIG. 1, an exemplary embodiment 100 of the present invention is shown wherein an interrelationship of a USB communication model is shown. A host and a device may be divided into distinct layers. Solid arrows 102, 104, 106, 108 and 110 indicate the path taken during actual communications between the host 112 and the device 114. Dashed arrows 116 and 118 indicate logical host 112 to device 114 interfaces between each respective horizontal layer. Such communication, between client software resident on the host and the function provided by the device, may be accomplished based on needs of an application currently using the device and the capabilities provided by the device. For example, communication may be accomplished through different logical layers as required by the device and/or information handing system.

Figure 2:
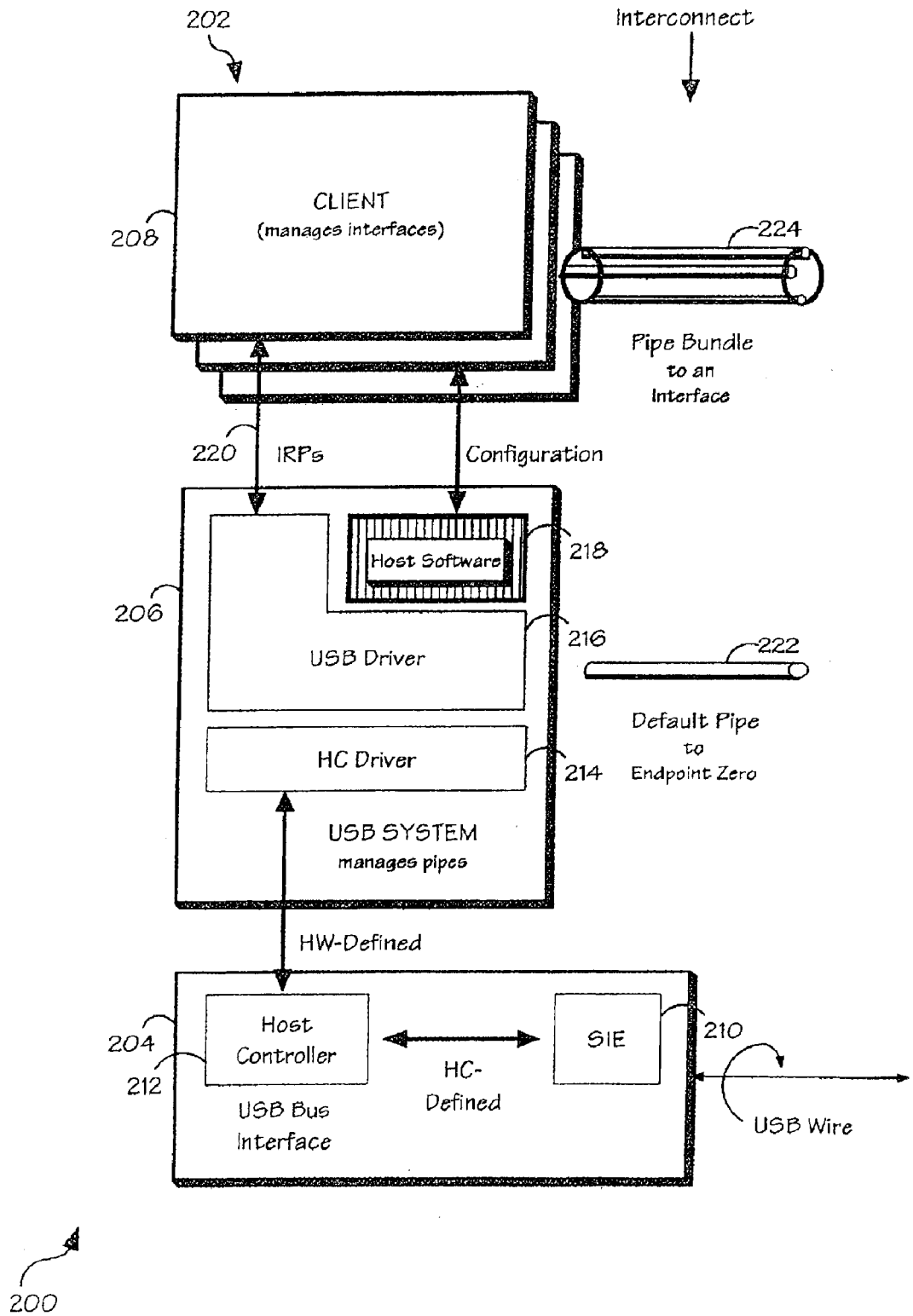
FIG. 2 is a block diagram illustrating an exemplary embodiment of the present invention wherein a host view of communication with a device is shown.

Referring now to FIG. 2, an exemplary embodiment 200 of the present invention is shown wherein a host view of communication with a device is shown. Typically, there is one host 202 for each USB. The major layers of a host include a USB bus interface 204, USB system 206, and client 208. The USB bus interface (USBI) 204 handles interactions for electrical and protocol layers. A similar USB bus interface may be provided by both the USB device and the host, as exemplified by a Serial Interface Engine (SIE) 210 from an interconnect point of view. However, on the host, the USB bus interface may include additional functions due to the role of the host on the USB. These additional functions may be implemented as the Host Controller 212. The Host Controller 212 may include an integrated root hub for providing attachment points to a USB wire.

The Host Controller 212 may be utilized by the USB System 206 to control the transfer of data between the Host 202 and USB devices. A hardware definition of the Host Controller 212 is utilized to define an interface between the USB System 206 and the Host Controller 212. The USB System 206 and Host Controller 212 perform translations between data transfers, from the client's point of view, and USB transaction appearing on the interconnect, which may include an addition of USB feature support, such as protocol wrappers and the like. The USB System 206 may also be utilized for managing USB resources, such as bandwidth, bus power, and the like.

A USB System 206 may be described as including three components, a host controller driver 214, a USB driver 216 and host software 218. A Host Controller Driver (HCD) 214 enables a client to interact with a device without knowing to which Host Controller 212 the device is connected. For example, a Host Controller Driver (HCD) 214 may enable a client to interact with a device by mapping various Host controller implementations into the USB System 206. The USB Driver (USBD) 216 may provide a basic host interface (USBDI) for clients to USB devices. The interface between the HCD 214 and the USBD 216 is known as the Host Controller Driver Interface (HCDI). Preferably, this interface is not available directly to a client, however, a particular HCDI may be defined by each operating system that supports various Host Controller 212 implementations.

The USB Driver (USBD) 216 provides a data transfer mechanism in the form of I/O Request Packets (IRPs) 220. An I/O Request Packet (IRP) 220 may include a request to transport data across a specific pipe. In the present discussion, a pipe 222 and 224 represents a connection abstraction between two horizontal layers, as shown in FIGS. 1 and 2. The USB Driver (USBD) 216 may also be responsible for presenting to a client an abstraction of a USB device that may be manipulated for configuration and state management. It may be preferable that the USBD "owns" the default pipe 222 through which all USB devices may be accessed for the purposes of standard USB control. A default pipe 222 may represent a logical communication between the USBD and the abstraction of a USB device, an example of which is shown in FIG. 2.

Additional non-USB System Software may be made available in some operating systems that provides configuration and loading mechanisms to device drivers. In such an operating system, the device driver may use the provided interface instead of directly accessing the USBDI mechanism.

The client layer 208 describes the software entities that are responsible for directly interacting with USB devices. When a device is attached to the system, clients may interact directly with the peripheral hardware. The shared characteristics of the USB place USB System Software between the client and its device. In other words, a client cannot directly access the device's hardware.

Host layers typically provide the following capabilities: (1) detecting the attachment and removal of USB devices; (2) managing USB standard control flow between the host and USB devices; (3) Managing data flow between the host and USB devices; (4) collecting status and activity statistics; and (5) controlling the electrical interface between the Host Controller and USB devices, including the provision of a limited amount of power.

Figure 3:
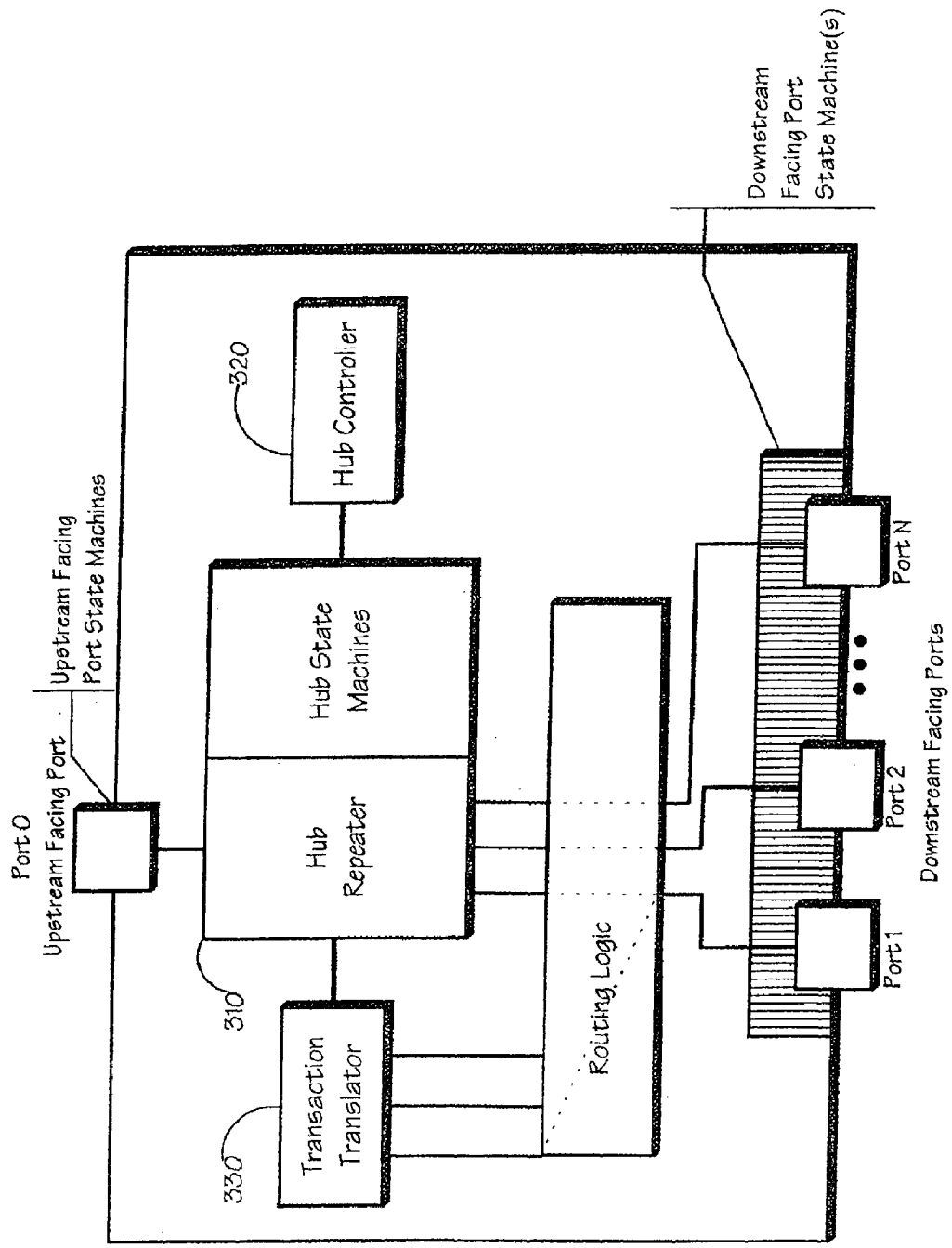
FIG. 3 is a block diagram depicting an exemplary embodiment of the present invention wherein a hub architecture operable to employ the present invention is shown.

Referring generally now to FIG. 3, an exemplary hub architecture is described. A hub may report internal status changes and port change status via a status change pipe. For example, this may include a notification of when a USB device is attached to or removed from one of their ports. A USBD client generically known as the hub driver receives these notifications as owner of the hub's Status Change pipe. For device attachments, the hub driver then initiates the device configuration process. In some systems, this hub driver is a part of the host software provided by the operating system for managing devices.

Hubs provide the interface between USB devices and the host, such as an information handling system and the like. Typically, hubs are responsible for supporting USB functions that make them more desirable over previous connection systems. These functions and aspects include power management, "hot" device connection and disconnection detection, bus fault detection and recovery, support for multiple speeds of devices, and the like. Typically, a hub includes three components, a hub repeater, hub controller, and transaction translator. The hub repeater supports a variety of functions, including connectivity setup, exception handling (such as bus fault detection and recovery) and connect/disconnect detect and the like. The Hub Repeater controls connectivity between ports, which are operating at the same speed. The Hub controller provides host-to-hub communication, such as status and control, and permits host access to the hub. Control commands specific to the Hub status permit the host to configure a hub and control ports included on the hub. The transaction translator translates high-speed split transaction to full/low speed transactions for compatibility with full/low speed devices attached to ports on the hub.

Figure 4:
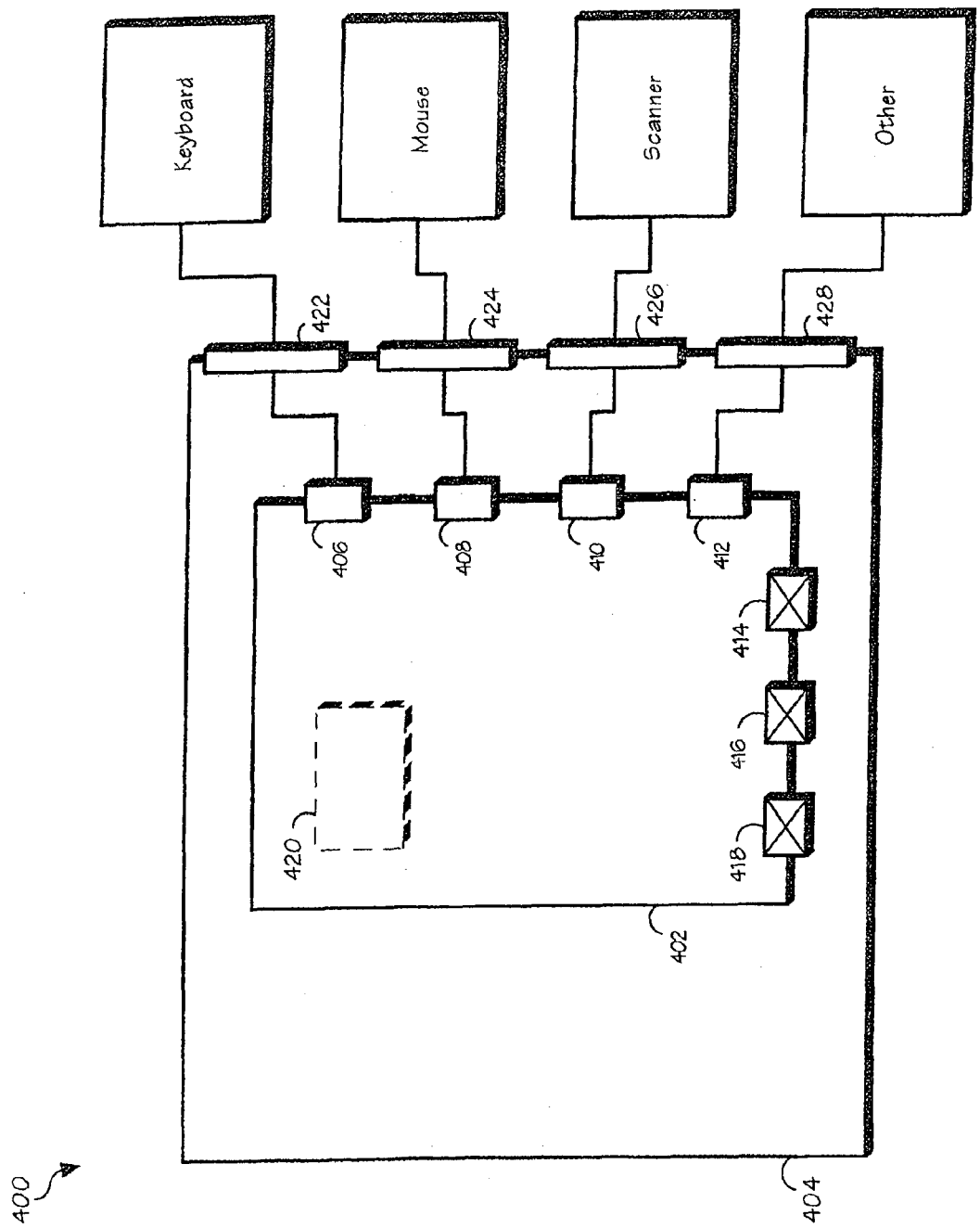
FIG. 4 is a block diagram illustrating an exemplary embodiment of the present invention wherein a USB hub includes a registry suitable for being changed by a user to report the number of actual ports included by the hub.

Referring now to FIG. 4, an exemplary embodiment 400 of the present invention is shown wherein a USB hub includes a registry suitable for being changed by a user to report the number of actual ports included by the hub. Previously, the number of ports supported by a USB hub had to be set up through an external hardware change, such as by selecting the number of ports by an Input Pin. This required extensive hardware changes by manufacturers of the system. For instance, in certain applications, manufacturers would incorporate a USB hub capable of supporting more ports than were included on the information handling system. Therefore, the information handling system may report a greater number of ports than were actually available on the system, resulting in consumer confusion. By including a registry on the USB hub that is capable of being changed by a manufacturer, user, and the like, the USB hub may report the number of ports actually included on the present configuration. In this way, consumer confusion may be greatly reduced. Further, the USB hub may be used in a greater number of applications without external hardware changes, resulting in a savings of both time and money.

Thus, in an exemplary embodiment a USB hub 402 may be connected to a motherboard 404 of an information handling system. The USB hub 402 may be capable of supporting a first port 406, second port 408, third port 410, fourth port 412, fifth port 414, sixth port 416 and a seventh port 418. Although seven ports are described, it should be appreciated that a variety of ports are contemplated by the present invention without departing from the spirit and scope thereof. However, a desired configuration of the information handling system may include only four actual ports. A registry 420 may be included on the USB hub 402 for indicating the number of ports as desired by the information handling system. In this way, the ports may be programmed to report or not to report by internal settings. For example, the registry 420 may be set during manufacture of the information handling system in memory, such as electrically erasable programmable read only memory (EEPROM), and other semiconductor and non-semiconductor based memories and the like. Therefore, a manufacturer desiring to include only four ports 422, 424, 426 and 428 may utilize a USB hub of the present invention without causing consumer confusion. It may be desirable to enable the internal settings to be accessed by an external bus, such as the universal serial bus itself. Thus a USB hub may be provided that is suitable for use on a variety of information handling systems regardless of the number of ports included on the information handling system, yet still return correct information regarding the actual number of ports on the information handling system and without requiring extensive hardware modifications.

Figure 5:
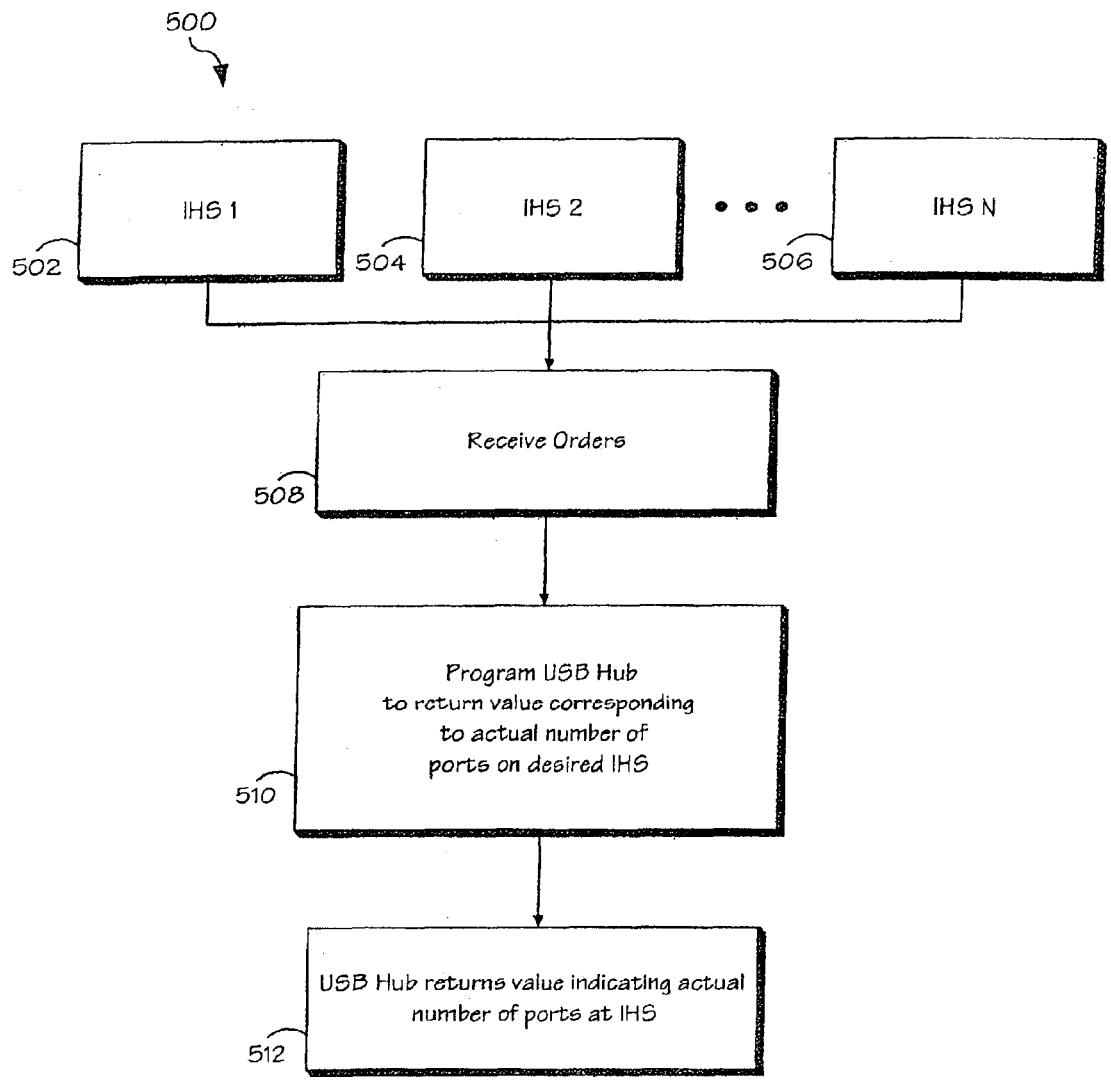
FIG. 5 is a flow diagram illustrating an exemplary embodiment of the present invention wherein a USB hub is configured upon manufacture to report the number of actual ports included on a corresponding information handling system.

Referring now to FIG. 5, an exemplary embodiment 500 of the present invention is shown wherein a USB hub is configured upon manufacture to report the number of actual ports included on a corresponding information handling system. A manufacturer may offer a variety of information handling systems, each with a different number of ports. Previously, the provision of these disparate information handling systems required different hardware configurations to support the different number of ports, namely the provision of different USB hubs corresponding to the number of ports desired. Failure to provide these different hubs may result in a hub reporting a different number of ports than are actually included on the information handling system. However, by utilizing the present invention, a manufacture may receive orders for a plurality of information handling systems 502, 504 and 506 including different amounts of ports 508. A USB hub of the present invention may still be utilized by each of the information handling systems by having the USB hub programmed to return a value corresponding to the number of actual ports on the system 510, and may be accomplished in a manner similar to programming an EEPROM or the like included with the USB hub. Thus, a plurality of information handling systems may be produced utilizing similar USB hubs, yet still have the USB hub return the actual number of ports included in the information handling system 512. For example, in response to a "desciport" query, the USB hub may return the value as programmed during manufacture.

Figure 6:
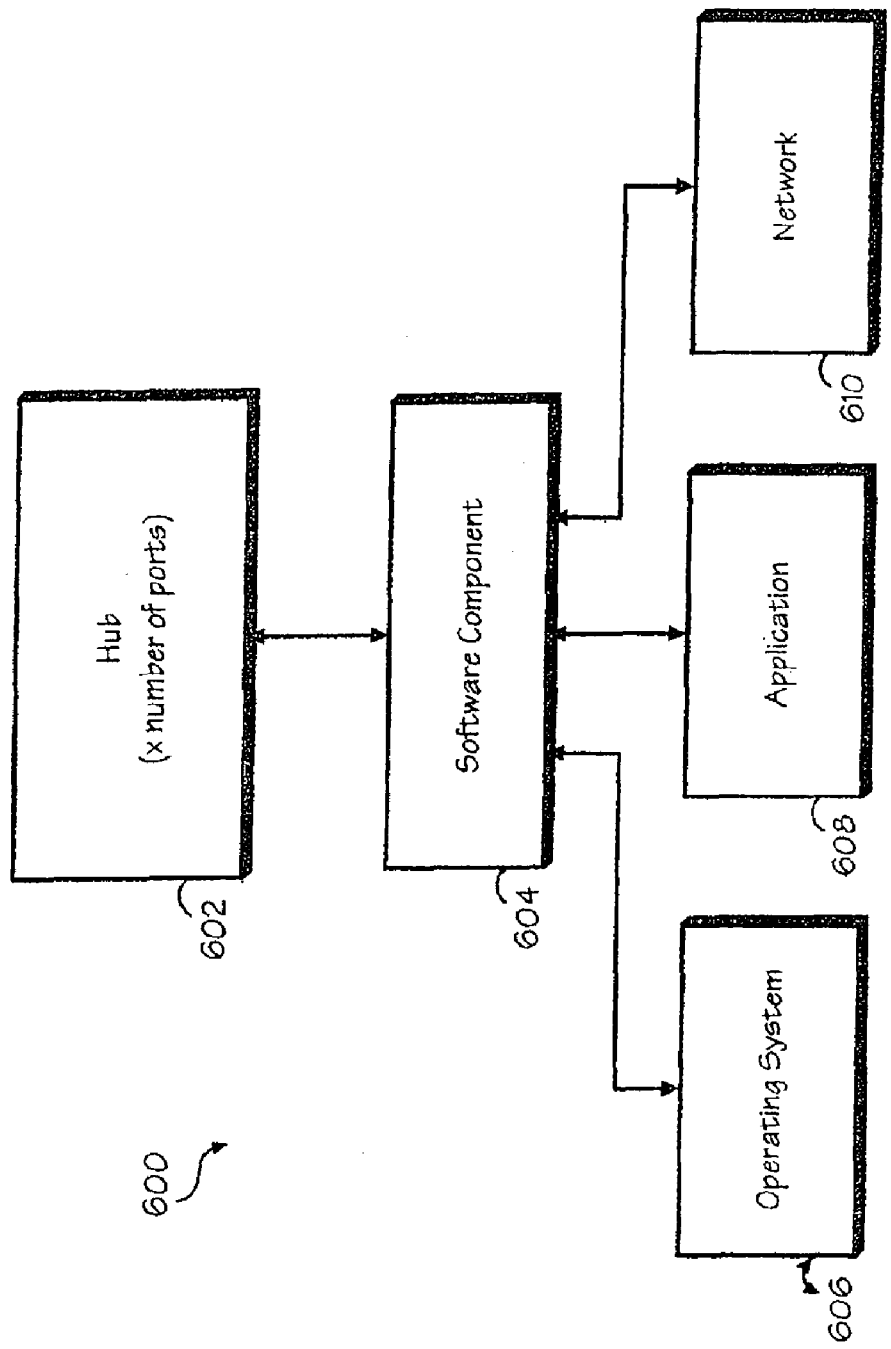
FIG. 6 is a block diagram depicting an exemplary embodiment of the present invention wherein a software component is utilized to supply the actual number of ports included on an information handling system.

Referring now to FIG. 6, an exemplary embodiment 600 of the present invention is shown wherein a software component is utilized to supply the actual number of ports included on an information handling system. As stated before, a hub 602 may contain support for more ports than are actually included on an information handling system. Thus, a query performed on a previous information handling system to determine the number of ports would indicate a greater number ports than are actually contained on the system. In an embodiment of the present invention, a software component 604 may be utilized to return the actual number of ports contained on the system. Thus, in response to a query, such as from an operating system 606, application 608, network interface 610 and the like the actual number of ports may be indicated. The software component 604 may include an operating system driver, interface, host software, portion of the BIOS, Host Controller Driver (HCD), USB Driver (USBD), USB Driver Interface (USBDI), Host Controller Driver Interface (HCDI) and the like as contemplated by a person of ordinary skill in the art without departing from the spirit and scope thereof. It may be preferable to program the software component 604 during manufacture of the information handling system to return a value corresponding to the number of actual ports included on the information handling system. In this way, the present invention may utilize a variety of preexisting USB to supply the actual number of ports included on an information handling system.

Additionally, it may be preferable to add a step to the BIOS test to determine if it the amount of ports indicated by the port value correspond to the actual number of ports included on the information handling system. For example, when an information handling system is booted, as part of the boot-up procedure, the actual number of ports included on the information handling system may be compared with the actual port value to verify its accuracy.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the USB hub with soft select ports of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of manufacturing an information handling system including a universal serial bus (USB) hub, comprising:
   receiving an order for an information handling system including a universal serial bus (USB) hub; and
   programming the universal serial bus (USB) hub with an actual port value, wherein the actual port value corresponds to the actual number of ports included on the information handling system, said programming comprising selecting the actual port value by an Input Pin.

2. The method as described in claim 1, wherein the actual port value indicates the actual number of ports on the information handling system, wherein the port value is less than the number of ports capable of being supported by the universal serial bus (USB) hub.

3. The method as described in claim 1, wherein said programming further comprises programming a register included on the universal serial bus (USB) hub.

4. The method as described in claim 1, wherein said programming further comprises programming a software component.

5. The method as described in claim 1, wherein the universal serial bus (USB) hub is programmed over an external bus.

6. The method as described in claim 4, wherein the software component includes at least one of an operating system driver, interface, host software, portion of the BIOS, Host Controller Driver (HCD), USB Driver (USBD), USB Driver Interface (USBDI), and Host Controller Driver Interface (HCDI).

7. The method as described in claim 5, wherein the external bus is a universal serial bus (USB).

8. A method of setting an actual port value of an information handling system including a universal serial bus (USB) hub, comprising:
   accessing a universal serial bus (USB) hub; and
   programming the universal serial bus (USB) hub with an actual port value, wherein the actual port value corresponds to the actual number of ports included on the information handling system, said programming comprising selecting the actual port value by an Input Pin.

9. The method as described in claim 8, wherein the actual port value indicates the actual number of ports on the information handling system, wherein the port value is less than the number of ports capable of being supported by the universal serial bus (USB) hub.

10. The method as described in claim 8, wherein said programming further comprises programming a register included on the universal serial bus (USB) hub.

11. The method as described in claim 8, wherein said programming further comprises programming a software component.

12. The method as described in claim 8, wherein the universal serial bus (USB) hub is programmed over an external bus.

13. The method as described in claim 11, wherein the software component includes at least one of an operating system driver, interface, host software, portion of the BIOS, Host Controller Driver (HCD), USB Driver (USBD), USB Driver Interface (USBDI), and Host Controller Driver Interface (HCDI).

14. The method as described in claim 12, wherein the external bus is a universal serial bus (USB).

15. A method of indicating a number of actual universal serial bus (USB) ports on an information handling system, comprising:
   receiving a query for a universal serial bus (USB) hub port value; and
   returning the universal serial bus (USB) hub port value, wherein the universal serial bus (USB) port value is suitable for being changed by a user through programming, said programming comprising selecting the universal serial bus (USB) port value by an Input Pin.

16. The method as described in claim 15, wherein the universal serial bus (USB) port value indicates the actual number of ports on the information handling system, and the universal serial bus (USB) port value is less than the number of ports capable of being supported by the universal serial bus (USB) hub.

17. The method as described in claim 15, wherein said programming further comprises programming a universal serial bus (USB) hub register, wherein the universal serial bus (USB) hub register is included on the universal serial bus (USB) hub.

18. The method as described in claim 15, wherein the universal serial bus (USB) hub port value is returned from a software component.

19. The method as described in claim 15, wherein the universal serial bus (USB) hub port value is suitable for being programmed by a user over an external bus.

20. The method as described in claim 18, wherein the software component includes at least one of an operating system driver, interface, host software, portion of the BIOS, Host Controller Driver (HCD), USB Driver (USBD), USB Driver Interface (USBDI), and Host Controller Driver Interface (HCDI).

21. The method as described in claim 19, wherein the external bus is a universal serial bus (USB).

* * * * *